United States Patent [19]

Chen

[11] Patent Number: 5,343,203
[45] Date of Patent: Aug. 30, 1994

[54] DOPPLER TRACKING METHOD FOR OBJECT IMAGING FROM RADAR RETURNS

[75] Inventor: Ernest C. Chen, San Pedro, Calif.

[73] Assignee: Hughes Aircraft Company, Los Angeles, Calif.

[21] Appl. No.: 949,920

[22] Filed: Sep. 24, 1992

[51] Int. Cl.$^5$ .............................................. G01S 13/00
[52] U.S. Cl. ....................................................... 342/25
[58] Field of Search ..................................... 342/99, 25

[56] References Cited

U.S. PATENT DOCUMENTS

| | | | |
|---|---|---|---|
| 4,786,906 | 11/1988 | Krogager | 342/25 |
| 4,825,213 | 4/1989 | Smrek | 342/25 |
| 5,045,855 | 9/1991 | Moreira | 342/25 |

*Primary Examiner*—Mark Hellner
*Attorney, Agent, or Firm*—L. A. Alkov; W. K. Denson-Low

[57] ABSTRACT

A method of tracking an object in the Doppler dimension that provides for improved imaging. The method tracks the centroid of the object's Doppler and smooths out noisy estimates of its phase history. The tracking and smoothing combine to improve tracking performance and image quality. Doppler signals are generated by a coarse Doppler tracker that removes translational motion of the object. Pulse pair processing produces an estimate the Doppler centroid of the object. For each pair of adjacent pulses, pulse pair processing is applied to individual range bins, and the outputs are combined to estimate the Doppler centroid of the object at that particular time. A low pass filter is used after pulse pair processing to smooth out phase increments. Phase increment smoothing then filters the output signals from the filter with a smooth curve, such as a second-degree polynomial. Phase recursion then produces a phase history. The recursive phase history is differenced with updated, appropriately delayed phases. The difference phases are compensated from the radar return from the coarse Doppler tracker. Fast Fourier transform processing then produces a Fourier transformed image. The output from the filter is also processed to update the phase and the phase updated signals are fed back to the coarse Doppler tracker. The phase updating integrates the output of the filter to update the phase history of the object based on phase increments derived from the filter. The phase update is also delayed in order to match these phases in timing with those from the phase recursion step.

4 Claims, 2 Drawing Sheets

DOPPLER TRACKING METHOD FOR OBJECT IMAGING FROM RADAR RETURNS

BACKGROUND

The present invention relates to Doppler tracking methods, and more particularly, to Doppler tracking methods that provide for object imaging from radar returns.

Currently, the most widely known method of object tracking using an inverse synthetic array radar (ISAR) system is what is know as a "hot spot" tracker. The hot spot tracker relies on assumption that the object contains an isolated strong scatterer. Unfortunately, such a scatterer may not exist on any target and/or at any particular moment. The tracked scatterer often scintillates, which adversely affects image quality. The tracked scatterer may also fade away in terms of its radar cross section (RCS) or be blocked by other parts of the object as time goes on. If and when these events happen, another isolated strong scatterer must be acquired. Even if such a replacement scatterer is obtained, a transition period will exist during which images may jump and defocus in the Doppler dimension. These undesirable effects may be alleviated to some degree by using a long time constant for the tracking filter. However, the filter is less responsive to the dynamic motion of the object, such as acceleration or maneuvers, for example.

It is therefore an objective of the present invention to provide for a method for object imaging from radar returns while eliminating all of the above-cited difficulties.

SUMMARY OF THE INVENTION

In order to provide for the above and other objectives, the present invention provides for a method of tracking an object in the Doppler dimension that provides improved imaging. The present method tracks the centroid of the object's Doppler with an algorithm or computer implemented processing procedure that is suitable for real time implementation. The method also contains a processing scheme that smooths out noisy estimates of the phase history of the object. The tracking and smoothing features of the present method combine to improve tracking performance and image quality when compared with existing tracking methods.

More specifically, the present invention processes Doppler signals generated by a coarse Doppler tracker that processes the radar return signals and removes translational motion of the object. The present Doppler tracking method comprises a pulse pair processing step that processes Doppler output signals from the coarse Doppler tracker that produces an estimate the Doppler centroid of the object. For each pair of adjacent pulses, pulse pair processing is applied to individual range bins, and the outputs are combined to estimate the Doppler centroid of the object at that particular time. An alpha filtering step is used to process the output signals from the pulse pair processing step by means of a low pass falter that is used to smooth out phase increments generated in the pulse pair processing step. A phase increment smoothing step is then performed that filters the output signals from the alpha filtering step with a second-degree polynomial, for example. A phase recursion step is then performed to produce a phase history. A fast Fourier transform step is then performed to produce a Fourier transformed (FFT) signal.

The output from the alpha filtering step is also processed by a phase update step whose output is fed back to the coarse Doppler tracker. The phase update step integrates the output of the alpha filtering step to update the phase history of the object based on phase increments derived from the alpha filtering step. In addition, the output of the phase update step is delayed in order to match the phases provided by the phase update step with those from the phase recursion step, since the phase recursion step outputs a new group of phases for every new image, instead of every new pulse.

The present invention provides improved ISAR (inverse synthetic array radar) imaging performance by providing a computationally efficient method. Specific improvements of the present invention are that images are centered, stabilized, and focused in the doppler dimension, image noise is reduced, and the method does not rely on the existence of strong and isolated scatterers.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
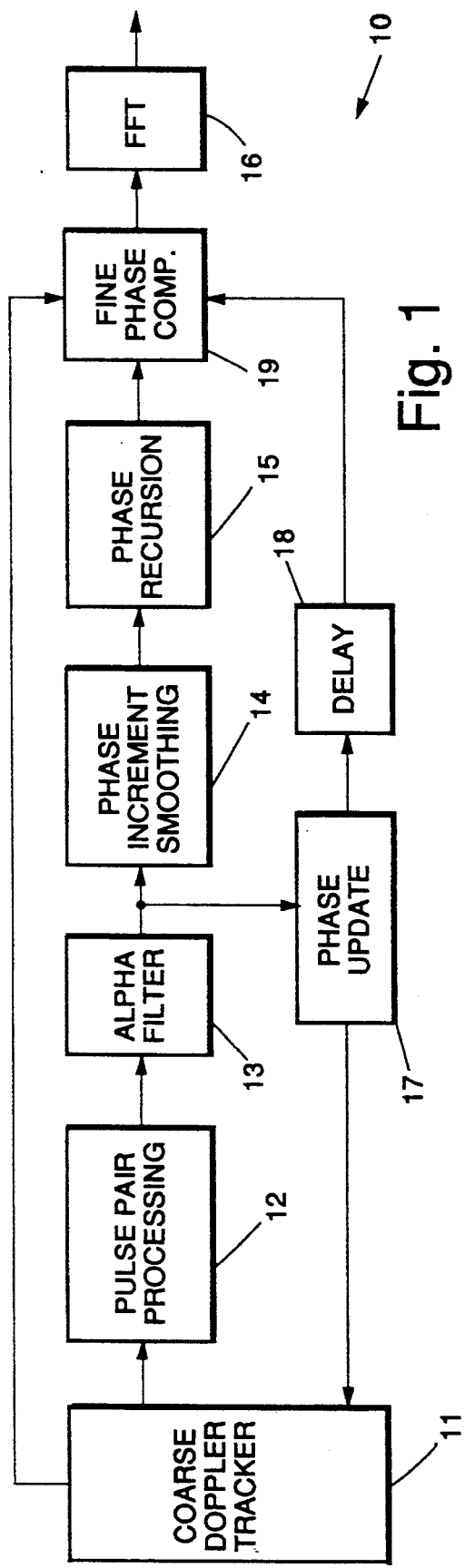
FIG. 1 shows a functional block diagram illustrating a Doppler tracking method in accordance with the principles of the present invention that provides for object imaging from radar returns.

Referring to the drawing figures, and with reference to FIG. 1, it a shows a functional block diagram illustrating a Doppler tracking method 10 in accordance with the principles of the present invention that provides for object imaging from radar return signals. The Doppler tracking method 10 processes Doppler signals generated by a coarse Doppler tracker 11 that initially processes the radar return signals to remove translational motion of the object. The present Doppler tracking method 10 processes the Doppler output signals from the coarse Doppler tracker 11 by means of the following processing steps.

The Doppler tracking method 10 comprises a pulse pair processing step 12 that processes the Doppler output signals from the coarse Doppler tracker 11. This produces pulse pair processed signals that are an estimate of the Doppler centroid of the object. For each pair of adjacent pulses, pulse pair processing is applied to individual range bins, and the outputs are combined to estimate the Doppler centroid of the object at that particular time. An alpha filtering step 13 is used to process the output signals from the pulse pair processing step 12. The alpha filtering step 13 provides for a low pass filter that is used to smooth out phase increments obtained in the pulse pair processing step 12. A phase increment smoothing step 14 is performed after the alpha filtering step 13 which filters the output signals of the alpha filtering step 13 with a second-degree polynomial, for example. A phase recursion step 15 is performed subsequent to the phase increment smoothing step 14 to produce a phase history. An amount of phase equal to the difference between the output from the phase recursion step 14 and the delay step 18 is compensated in a fine phase compensation step 19. A fast Fourier transform (FFT) step 16 is then performed on the output of the fine phase compensation step 19 to produce a Fourier transformed (FFT) image.

The output from the alpha filtering step 13 is also processed by a phase update step 17 whose output is fed back for use in the coarse Doppler tracker 11. The phase update step 17 integrates the output of the alpha filtering step 13 to update the phase history of the object based on phase increments derived from the alpha filtering step 13. In addition, the output of the phase update step 17 is processed by a delay step 18 to match the phases provided by the phase update step 17 with those from the phase recursion step 15, since the phase recursion step 15 only outputs a new group of phases for every new image.

The advantages of the present method are that target tracking is more reliable and image quality is better. Since the Doppler centroid is tracked, each image is automatically centered in the Doppler dimension. This allows the image display area to be used more efficiently. Another consequence of tracking the Doppler centroid is that the image sequence is stabilized in the Doppler dimension, whereas in conventional systems, images can be displaced vertically which normally distracts an operator and makes object classification more difficult. Stability of image sequence also implies that each image is in focus and therefore has high quality. Processing all range bins over the object range extent maximizes the signal strength while limiting sea clutter and noise contributions. This improves the signal to clutter ratio and signal to noise ratio for tracking. In addition, with regard to the phase increment smoothing step 14 described in detail below, phase refinement of the signals from the alpha filtering step 13 are provided and is applied before the Doppler FFT (step 16) to ensure that the effective phase compensation across the image integration time is smooth. This further reduces noise in the image.

Since the present method tracks the Doppler centroid, it does not require an isolated strong scatterer as is required by the conventional hot shot tracker or tracking method. This ensures that tracking is continuous regardless of a scatterers distribution, scintillation, or blocking effects.

At the heart of the present invention is the pulse pair processing step 12. However, prior to performing the pulse pair processing 12, the residual object Doppler is reduced by the coarse Doppler tracker 11 to less than pi radians over a pulse repetition interval (PRI), or one effective PRI if presumming is used. The small error produced by this tracker 11 also ensures that range bins of adjacent pulses are sufficiently lined up for Doppler processing. Methods of coarse Doppler tracking are generally well-known in the art and will not be discussed in detail herein. A description of the pulse pair processing step 12 follows.

Figure 2:
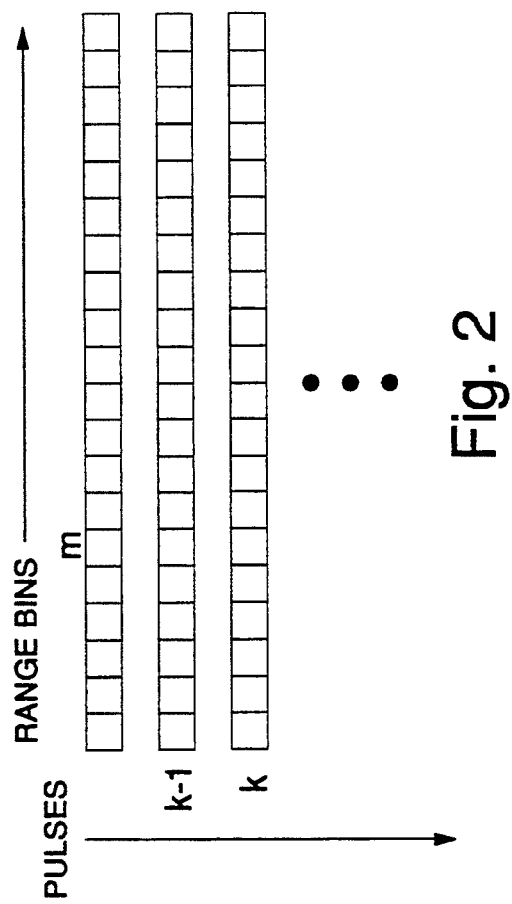
FIG. 2 illustrates pulse pair processing in accordance with the present invention employed in the Doppler tracking method of FIG. 1.
Figure 3A:
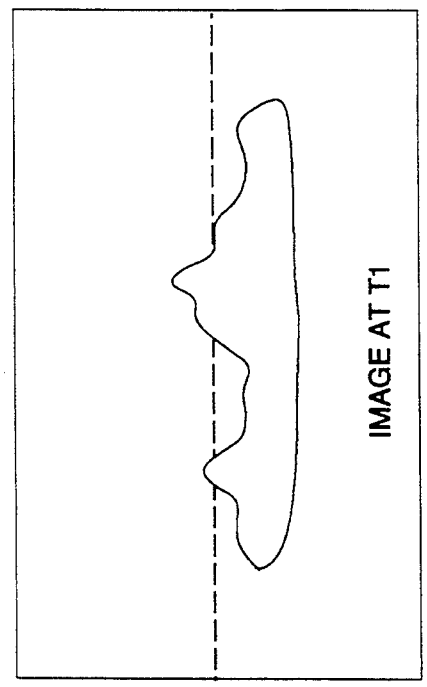
FIGS. 3a and 3b show images produced by a conventional hot spot tracker.
Figure 3C:
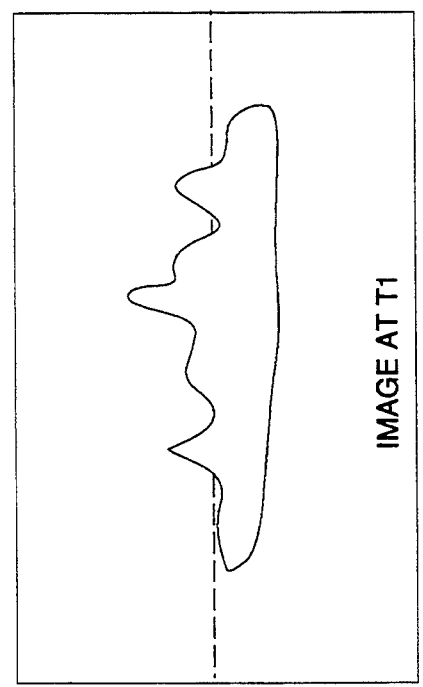
Figs. 3c and 3d show images produced by the tracking method in accordance with the present invention shown in FIG. 1.
Figure 3B:
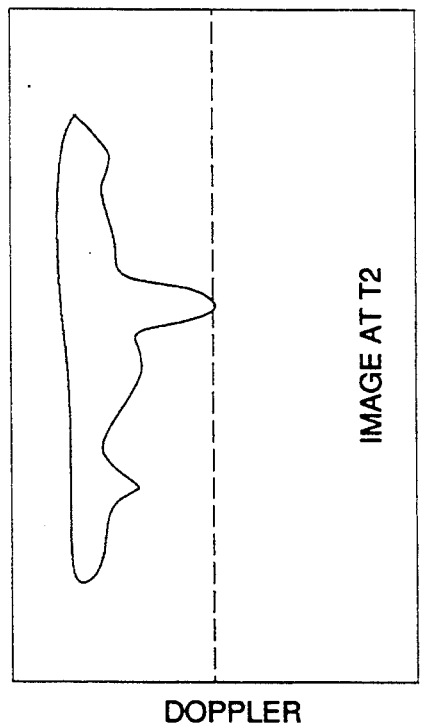
Figure 3D:
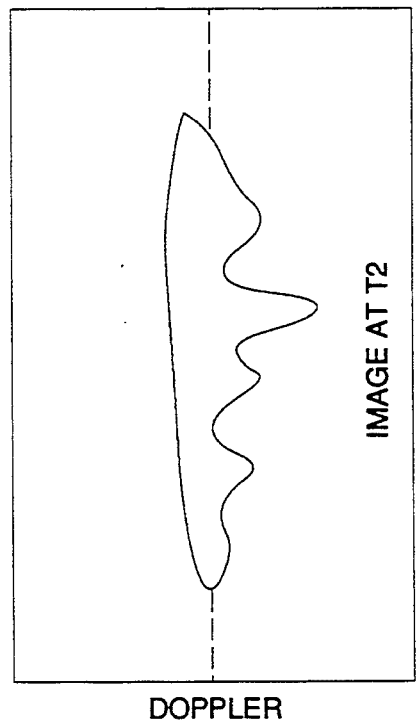

For each pair of adjacent pulses, pulse pair processing is applied to individual range bins, and the outputs are combined to estimate the Doppler centroid of the object at that particular time. This is depicted in FIG. 2 which illustrates a plurality of range bins, one of which (m) is selected, and a plurality of pulses (k-1, k) that are combined to estimate the Doppler centroid. The processing is performed in accordance with the following equations:

$$D_k = \sum_m C_{k,m} \tilde{C}_{k-1,m}$$

$$\epsilon_{\Delta\theta_k} = \tan^{-1} \frac{Im(D_k)}{Re(D_k)}$$

where $C_{k,m}$ is the complex sample at the m-th range bin and the k-th pulse and $\tilde{C}$ is the complex conjugate of C. Summation is over the target range extent and the complex sum, $D_k$, is obtained. The summation implies that it is the Doppler centroid of the object that is tracked rather than any particular scatterer.

The alpha filtering step 13 provides for processing by means of a low pass filter that is used to smooth out phase increments obtained in the pulse pair processing step 12. The equation for the alpha filtering step 13 is $$\Delta\Phi_k = \Delta\Phi_{k-1} + \alpha\epsilon_{\Delta\Phi_k}.$$

The initial phase increment $\Delta\Phi_0$ is provided by the coarse Doppler tracker 11 and this increment should be unambiguous (no modulo 2 pi). An empirical value such as 0.05 may be used for $\alpha$. The filtered phase increments generated by the alpha filtering step 13 are used in the phase update and phase increment smoothing steps 14, 17 of the present invention and are discussed below. The phase update step 17 integrates the output of the alpha filtering step 13 to update the phase history of the object based on phase increments from the alpha filtering step 13. Outputs are generated at the PRF rate and are fed back to the coarse Doppler tracker 11 as is shown in FIG. 1. The equation is $$\Phi_k = \Phi_{k-1} + \Delta\Phi_k$$

with $\Phi_0$ set at 0

The purpose of the Doppler tracker 11 is to remove translational motion of the object. The object's motion, and therefore its phase history, is generally a smooth function of time. However, the phase increments obtained from the alpha filtering step 13 contain noise, including noise in the raw data and noise from the pulse pair processing step 12 with finite Doppler spread of the object. Smoothing is performed by the phase increment smoothing step 14 by faltering the outputs of the alpha filtering step 13 with a second-degree polynomial, although a higher-degree polynomial or other curves may be used for objects with high motion dynamics.

The phase increment smoothing step 14 is performed over each image integration time and at the image update rate. For example, if a one-second integration time is desired with a PRF of 256 Hz, then 256 phase increments are smoothed for each new image. If, in addition, the image update rate is 4 Hz, then 64 samples are skipped for each new smoothing function.

Smoothing may also be done over unwrapped phases rather than over phase increments. However, since values of the unwrapped phase history are expressed in radar wavelengths and thus have a huge dynamic range, this technique requires a longer computer word for data representation.

Once the phase increment smoothing step 14 is done, the phase history is efficiently obtained by a simple phase recursion step 15. If the smoothed phase increments are represented by a second-degree polynomial, for example, a third degree polynomial phase history is obtained. This means that phase errors up to the third order are included for free phase compensation on each image before processing by the Doppler FFT step 16.

For example, by using a second-degree polynomial, the smoothed phase increments are given by $$\Delta \overline{\Phi}_n = a_0 + a_1 n + a_2 n^2.$$

The smoothed phase history obtained from the phase recursion step 15 is given by $$\overline{\Phi}_n = (\overline{\Phi}_{n-1} + \Delta \overline{\Phi}_{n-1}) \bmod 2\pi$$

$$\Delta \overline{\Phi}_n = \Delta \overline{\Phi}_{n-1} + \Delta \overline{\Phi}_{n-1}$$

$$\Delta^2 \overline{\Phi}_n = \Delta^2 \overline{\Phi}_{n-1} + 2a_2$$

with initial values given by $$\overline{\Phi}_0 = 0, \Delta \overline{\Phi}_0 = a_0, \text{ and } \Delta^2 \overline{\Phi}_0 = a_1.$$

The smoothed phase history is the desired net compensation on the raw data. Since part of this phase has already been compensated in the coarse Doppler tracker 11 prior to the pulse pair processing step 12 as is shown in FIG. 1, the amount of fine phase compensation provided by the phase recursion step 15 is adjusted in the fine phase compensation step 19 according to the equation $$\epsilon \Phi_k = \overline{\Phi}_k - \Phi_k.$$

The delay step 18 represents a memory buffer that stores the integrated and updated phases provided by the phase update step 17 that arrive at the PRF rate or the presumed PRF rate. The delay is necessary to match in timing the phases provided by the phase update step 17 with those from the phase recursion step 15, since the phase recursion step 15 outputs a new group of phases for every new image.

Thus there has been described new and improved Doppler tracking methods that provide for object imaging from radar returns. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A Doppler tracking method that provides for object imaging from radar return signals, said method comprising the steps of:

tracking an object by means of a coarse Doppler tracker that processes the radar return signals and removes translational motion of the object;

pulse pair processing output signals from the coarse Doppler tracker to produce an estimate of the Doppler centroid of the object;

filtering output signals from the pulse pair processing step with a predetermined low pass filter that is used to smooth out phase increments generated in the pulse pair processing step;

smoothing output signals from the filtering step with a predetermined smooth curve;

recursively filtering output signals from the smoothing step to produce a phase history;

differencing the recursively filtered phase history with the updated phases that have been appropriately delayed;

compensating the difference phases from radar return from the coarse Doppler tracker, Fourier transforming the phase compensated signals to produce a Fourier transformed (FFT) image;

phase updating the output signals from the filtering step to integrate the output of the filtering step to update the phase history of the object based on phase increments derived from the filtering step;

delaying output signals from the phase updating step to match in timing the phases provided by the phase update step with those from the phase recursion step; and feeding back output signals from the phase updating step formed by the coarse Doppler tracker.

2. The method of claim 1 wherein the step of pulse pair processing the output signals from the coarse Doppler tracker comprises the step of:

for each pair of adjacent pulses, pulse pair processing individual range bins, and combining the outputs of each range bin to estimate the Doppler centroid of the object at a particular time.

3. The method of claim 1 wherein the step of smoothing output signals from the filtering step comprises smoothing output signals from the filtering step with a predetermined order polynomial.

4. The method of claim 2 wherein the step of pulse pair processing the output signals from the coarse Doppler tracker implements the equations:

$$D_k = \sum_m C_{k,m} \widetilde{C}_{k-1,m}$$

and $$\epsilon_{\Delta \theta_k} = \tan^{-1} \frac{Im(D_k)}{Re(D_k)}$$

where $C_{k,m}$ is a complex sample at the m-th range bin and the k-th pulse and $\overline{C}$ is a complex conjugate of C, and where the summation is over the target range extent.

* * * * *